United States Patent
Obara (10) Patent No.: US 6,657,340 B2
(45) Date of Patent: Dec. 2, 2003

(54) MOTOR AND METHOD OF MANUFACTURING THE SAME

(75) Inventor: Rikuro Obara, Miyota-machi (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/892,461

(22) Filed: Jun. 28, 2001

(65) Prior Publication Data

US 2002/0047392 A1 Apr. 25, 2002

(30) Foreign Application Priority Data

Jun. 29, 2000 (JP) ........................................ 2000-196652

(51) Int. Cl.[7] ................................................ H02K 7/08
(52) U.S. Cl. ............................ 310/90; 29/598; 384/100
(58) Field of Search ............................. 310/90; 29/598; 384/100

(56) References Cited

U.S. PATENT DOCUMENTS

| | | | | |
|---|---|---|---|---|
| 5,141,338 A | * | 8/1992 | Asada et al. ................ | 384/100 |
| 5,715,116 A | * | 2/1998 | Moritan et al. ............ | 310/67 R |
| 5,822,846 A | * | 10/1998 | Moritan et al. ............ | 29/598 |
| 5,880,545 A | * | 3/1999 | Takemura et al. ........ | 310/67 R |
| 6,057,619 A | * | 5/2000 | Domberg et al. .......... | 310/90 |
| 6,242,830 B1 | * | 6/2001 | Katagiri ..................... | 29/598 |
| 6,310,415 B1 | * | 10/2001 | Horng ........................ | 310/67 R |
| 6,354,742 B1 | * | 3/2002 | Iwaki et al. ............... | 384/107 |
| 6,364,532 B1 | * | 4/2002 | Yoshikawa et al. ....... | 384/100 |

FOREIGN PATENT DOCUMENTS

| | | | | | |
|---|---|---|---|---|---|
| JP | | 0874867 A | * | 3/1996 | |
| JP | | 09303408 A | * | 11/1997 | ........... F16C/35/02 |

* cited by examiner

Primary Examiner—Joseph Waks
(74) Attorney, Agent, or Firm—Oliff & Berridge, PLC (57) ABSTRACT

A motor and a method of manufacturing the motor are provided for preventing undesirable deformation of the sleeve hole caused by a press fitting force during press fitting process, thus facilitating the assembly process and improving the productivity. A recess is formed on an inner peripheral wall of a center cylindrical portion at the center of a flange body. When press fitting a sleeve body into a hole (sleeve fitting hole) of a flange assembly unit for integrating both members, the annular recess of the flange assembly unit serves to reduce the contact area between the sleeve body and the flange body. The press fitting force exerted to the contact area is reduced. Therefore the deformation of the inner diameter of the sleeve body that has been press fitted is minimized, thus suppressing deformation of the inner diameter portion of the sleeve body and the flange body.

7 Claims, 5 Drawing Sheets

MOTOR AND METHOD OF MANUFACTURING THE SAME

BACKGROUND OF THE INVENTION

1. Field of the Invention

The present invention relates to a motor such as a spindle motor that drives a magnetic disk for a hard disk drive used in a computer, and a method of manufacturing the same.

2. Description of Related Art

Recently the capacity of the hard disk drive has been increasing. Accordingly the hard disk drive requires employment of a motor capable of rotating at higher speeds so as to cope with the capacity increase. Instead of a ball bearing that has been generally employed for the motor, a fluid bearing has been increasingly applied to satisfy the requirement of the motor rotating at higher speeds.

Figure 5:
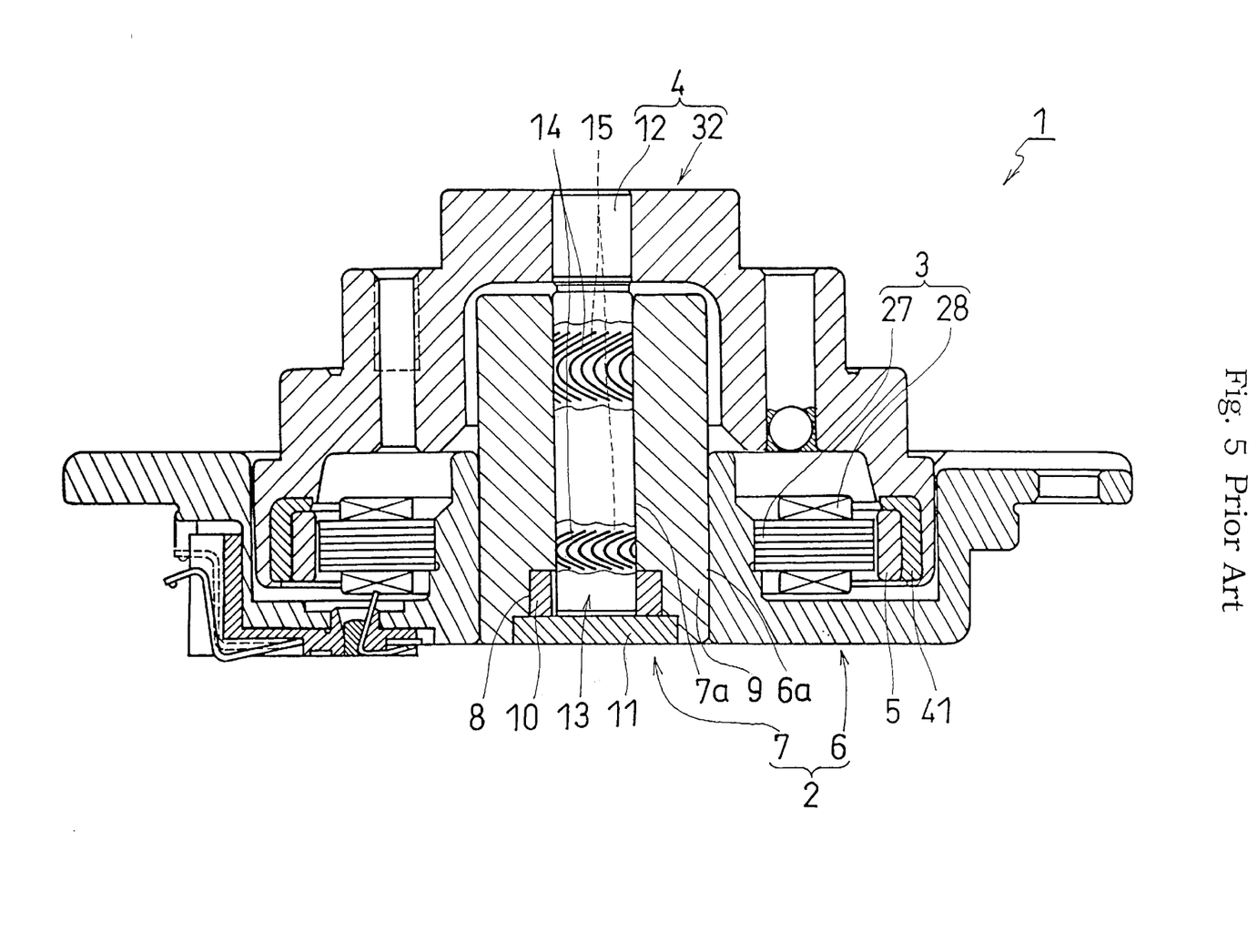
FIG. 5 is a cross sectional view of a conventional motor.

There is one known motor using a fluid bearing in a hard disk drive, an example of which is shown in FIG. 5. In FIG. 5, a motor 1 (a spindle motor for driving a magnetic disk) includes a stator 3 disposed on a flange 2 and a rotor 4 having a magnet 5 opposing the stator 3.

The flange 2 is generally formed of a flange body 6 for holding the stator 3, and a sleeve 7 press fitted into a hole (sleeve fitting hole 6a) formed in the flange body 6.

The sleeve 7 is generally composed of a cylindrical sleeve body 9 having an annular stepped portion 8 formed in the inner diameter portion at one end, an annular member 10 fitted in the annular stepped portion 8, and a disc-like counterplate 11. The counterplate 11 and the sleeve body 9 are air-tightly bonded by, for example, welding.

A shaft 12 of the rotor 4 is inserted into a hole (as a sleeve hole 7a) formed inside of the sleeve 7 (the sleeve body 9 and the annular member 10). A fluid bearing 13 is defined by the shaft 12 and the sleeve 7. An oil 14 is used as the fluid for the fluid bearing 13 in this example. It is, however, clearly understood that the oil may be replaced by gas such as air.

A plurality of grooves 15 are formed on the inner peripheral wall (sleeve hole 7a) of the sleeve body 9. A plurality of grooves (not shown) are also formed on the end portion of the annular member 10 in contact with the stepped surface of the sleeve body 9, and on the portion of the counterplate 11 in contact with the annular member 10. The space between the sleeve 7 and the shaft 12 including the grooves 15 and other grooves (not shown) are sealed with the oil fluid 14.

The oil fluid is compelled to form an oil film between the sleeve 7 and the shaft 12 under a dynamic pressure generated by a pumping effect of the rotating shaft 12. The shaft 12, thus, is allowed to rotate relative to the sleeve 7 through the oil film.

The sleeve body 9 is press fitted with the hole (sleeve fitting hole 6a) of the flange body 6 before mounting the stator 3 onto the flange body 6. In the state where the flange body 6 and the sleeve body 9 are assembled, the sleeve hole 7a (or the inner peripheral wall of the sleeve 7) is machined. The stator 3 is mounted onto the flange body 6, and then the annular member 10 and the counterplate 11 are assembled to the sleeve body 9 to constitute the sleeve 7. The shaft 12 of the rotor 4 is inserted into the sleeve hole 7a of the resultant assemble body of the sleeve 7 and the flange body 6. During the insertion of the shaft 12, the oil fluid 14 is poured into the vacuum space between the shaft 12 and the sleeve 7. The sleeve body 9 and the counterplate 11 are air tightly bonded by, for example, welding at the outer peripheral contact portion. Under the vacuum state of the space between the sleeve 7 and the shaft 12, the differential pressure with respect to the outside (atmospheric pressure) acts on the oil fluid 14 so as to prevent leakage thereof.

When press fitting the sleeve body 9 into the hole (sleeve fitting hole 6a) of the flange body 6, the pressure generated by the press fitting of the sleeve body 9 deforms the sleeve hole 7a (inner peripheral wall). The deformation may cause assembly failure that cannot allow the uniform clearance to be kept between the sleeve hole 7a and the shaft 12. Therefore the sleeve hole 7a (inner peripheral wall) is machined after press fitting the sleeve body 9 into the flange body 6 so as to cope with the deformation. The shaft 12, then, is inserted into the sleeve hole 7a to define the fluid bearing 13.

In case of the aforementioned motor 1, the sleeve hole 7a (inner peripheral wall) is machined in the state where the flange body 6 and the sleeve body 9 are assembled together. As the sleeve hole 7a has to be machined in a large assembled unit of the flange body 6 and the sleeve body 9, a large-sized jig that matches at the process of the large assembled unit is required. Since the assembled unit has a large size and a complicated configuration, the work efficiency is deteriorated, working time is elongated owing to the use of the large jig, and assembling work is complicated that may hinder automatization. In addition to the deteriorated productivity, the cutting fluid or the like tends to infiltrate into the press fitting point because the machining process is conducted after the press fitting. It is, therefore, difficult to completely remove the infiltrated cutting fluid even by cleaning. Therefore, the residual stained water may cause generation of outgas during actual operation.

SUMMARY OF THE INVENTION

The present invention has been made in consideration of the foregoing problem. It is, therefore, an object of the invention to provide a motor and a method of manufacturing the motor, which may prevent deformation of the sleeve hole (inner peripheral wall) due to the force generated by press fitting of the sleeve and may facilitate assembling work, thus improving the productivity and eliminating the cause of outgas.

According to a first aspect of the present invention, there is provided with a motor in which a rotor is provided with a magnet opposing to the stator of the flange that includes a flange formed of a flange body for holding a stator and a sleeve which is shrinkage fitted (or lightly press fit bonded) into a hole formed in the flange body, receives a shaft of a rotor inserted through an inner hole, and defines a fluid bearing together with the shaft, wherein a recess is formed at an opening of a wall with a hole of the flange body to relieve a press fitting force exerted to the sleeve.

According to a second aspect of the present invention in the first aspect, the recess is of an annular shape.

According to a third aspect of the present invention in the first aspect, the recess constitutes a grooved portion formed at an opening of the hole formed on the wall and/or a grooved recess formed on the inside area of the hole formed on the wall.

According to a fourth aspect of the present invention in the third aspect, the recess and/or a recess portion is of an annular shape.

According to a fifth aspect of the present invention in the motor of any one of the first to the forth aspects, wherein the sleeve is provided with a substantially cylindrical flange body into which the shaft is inserted, and a portion corresponding to the flange body and a portion corresponding to the sleeve body are integrally formed.

According to a six aspect of the present invention, there is provided with a motor that includes a flange formed of a sleeve having a lower bulge and a flange body, wherein a rotor is provided with a magnet opposing to a stator of the flange, and the stator is supported by the lower bulge of the sleeve.

According to a seventh aspect of the present invention, there is provided with a method of manufacturing a motor in which a rotor is provided with a magnet opposing to the stator of the flange, including a flange formed of a flange body for holding a stator and a sleeve which is provided with a recess and press fitted into a hole formed in the flange body, receives a shaft of a rotor inserted through an inner hole, defines a fluid bearing together with the shaft, and is further provided with a flange body having a substantially cylindrical shape into which the shaft is inserted, which includes the steps of press fitting the sleeve body finished by machining into a hole of the flange body, and inserting the shaft of the rotor into the hole of the sleeve body so as to define a fluid bearing.

In this case, the finished sleeve body is press fitted into the hole of the flange body. The subsequent process conducted to clean up the infiltrated cutting fluid is omitted.

According to an eighth aspect of the present invention in the seventh aspect, the recess is of an annular shape.

According to a ninth aspect of the present invention in the seventh aspect, the recess constitutes a cut off portion formed at an opening of the hole formed on the wall and/or a grooved recess formed on the inside area of the hole formed on the wall.

According to a tenth aspect of the present invention in the ninth aspect, the recess and/or a recess portion is of an annular shape.

According to an eleventh aspect of the present invention, there is provided with a method of manufacturing a motor including a flange formed of a sleeve having a lower bulge and a flange body, wherein a rotor is provided with a magnet opposing to a stator of the flange, and the stator is supported by the lower bulge of the sleeve, which includes the steps of press fitting the lower bulge of the sleeve body finished by machining into a hole of the flange body, and inserting the shaft of the assembled rotor into the hole of the sleeve body so as to define a fluid bearing.

DETAILED DESCRIPTION OF PREFERRED EMBODIMENTS

Figure 1:
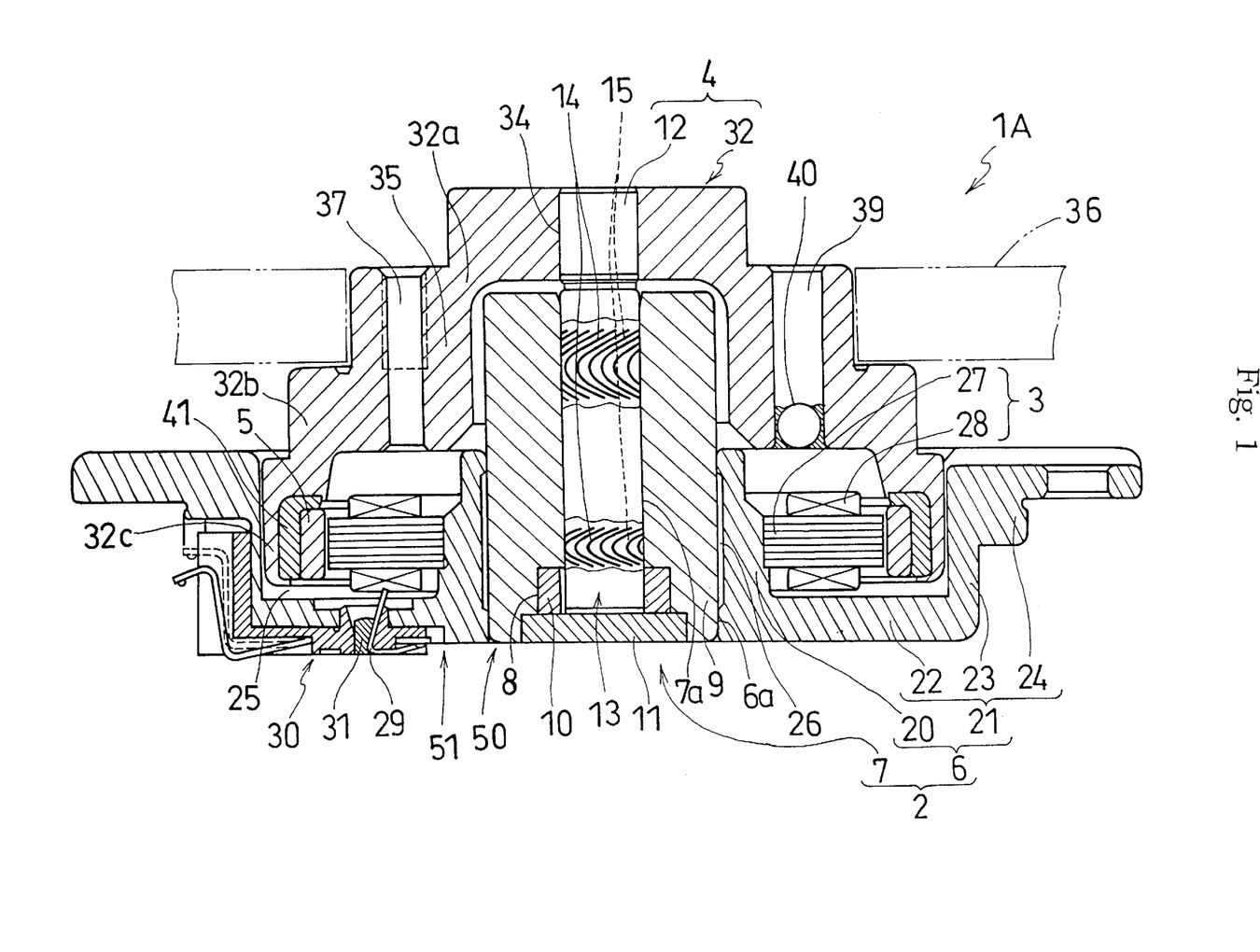
FIG. 1 is a cross sectional view of a motor according to a first embodiment of the present invention.

A first embodiment of the present invention will be described with reference to FIG. 1.

In a motor 1A (a spindle motor for driving a magnetic disk), a rotor 4 is provided with a magnet 5 so as to oppose the stator 3 disposed on the flange 2.

The flange 2 is generally composed of a flange body 6 made of aluminum or stainless steel for holding the stator 3, and a sleeve 7 press fitted into a hole (sleeve fitting hole 6a) formed in the flange body 6.

The flange body 6 is generally composed of a center cylindrical portion 20 having the sleeve fitting hole 6a, and a frame 21 extending radially outwardly from the base end of the center cylindrical portion 20.

The frame 21 is generally composed of an annular base 22 connected to the center cylindrical portion 20, a cylindrical outer peripheral wall 23 extending vertically from the outer peripheral end of the circular base 22, and an outer skirt or extending portion 24 extending radially outwardly from the top end of the outer peripheral wall 23. An annular space 25 is defined by the center cylindrical portion 20 and the outer peripheral wall.

An annular recess 26 (recess) is formed inside of the sleeve fitting hole 6a of the inner peripheral wall of the center cylindrical portion 20 (the portion away from an opening 6b of the sleeve fitting hole 6a).

The stator 3 includes a flange stack 27 and a coil 28 wound therearound, which is disposed in the annular space 25 with the flange stack 27 held on the outer periphery of the center cylindrical portion 20. The coil 28 is connected to the outer circuit (not shown) through a connector 30 to which a lead wire 29 is connected. In FIG. 1, a reference numeral 31 represents a seal member.

The sleeve 7 is generally composed of a cylindrical sleeve body 9 having an annular stepped portion 8 in the inner diameter portion on one end, an annular member 10 disposed in the annular stepped portion 8 of the sleeve body 9, and a disc-like counterplate 11. The counterplate 11 and the sleeve body 9 are air tightly bonded by, for example, welding.

A shaft 12 of the rotor 4 is inserted into a hole (sleeve hole 7a) formed in the sleeve 7 (the sleeve body 9 and the annular member 10). The sleeve 7 and the shaft 12 define a fluid bearing 13.

Namely, a plurality of grooves 15 are formed on the inner peripheral wall of the sleeve body 9. A plurality of grooves (not shown) are also formed on an end portion upward of the annular member 10 shown in FIG. 1, and on a portion of the counterplate 11 in contact with the annular member 10. The space between the sleeve 7 and the shaft 12 including the grooves 15 are sealed with the oil fluid 14. The grooves 15 and other grooves (not shown) are filled with the oil fluid 14.

The oil fluid is compelled to form an oil film between the sleeve 7 and the shaft 12 under a dynamic pressure generated by a pumping effect of the rotating shaft 12. The shaft 12, thus, is allowed to rotate relative to the sleeve 7 through the oil film.

The rotor 4 is generally composed of a hub 32 made of a material such as aluminum and stainless steel, and the shaft 12 fixed on the hub 32.

The hub 32 has a configuration in which a series of three cylindrical members each having a bottom and a different diameter are connected coaxially one after another at the respective open ends. For the purpose of explanation, the three cylindrical members with bottoms are designated as first, second and third hub cylindrical members 32a, 32b, 32c, respectively, in the order from the smallest to the largest diameter.

The shaft 12 is fitted into a hole 34 formed in the bottom of the first hub cylindrical member 32a.

The first hub cylindrical member 32a has an outer peripheral wall 35 around which a magnetic disk 36 is tightly fitted.

A female thread 37 is formed at the outer peripheral wall 35 of the first hub cylindrical member 32 so as to fix a cover which holds the magnetic disk 36. The first hub member 32a also has a plurality of holes 39 disposed in the circumference direction, and a counter weight 40 is selectively mounted in those holes 39.

The magnet 5 is mounted onto the inner peripheral portion of the third hub cylindrical member 32c through a yoke 41. The third hub member 32c is disposed in the annular space 25 so that the magnet 5 is positioned opposing to the stator 3. In this position, an electric current is supplied to the coil 28 to generate an electromagnetic force, thus rotating the magnet 5 and hence the rotor 4.

The stator 3 is mounted onto the flange body 6 (which is referred to as a flange assembly unit 51) and then the sleeve body 9 which has been finished and cleaned (finish machined) is press fitted (shrink fit or low-pressure force fit adhesion may be employed) into the hole 6a of the flange assembly unit 51. Namely the finished sleeve body is press fitted into the hole of the flange body.

Then the shaft 12 of the rotor 4, i.e. the assembled unit of the hub 32 and the shaft 12, is assembled with the hole 7a of the sleeve body 9 assembled together with the flange assembly unit 51, (by inserting the shaft 12 of the rotor 4 into the hole 7a of the sleeve body 9), then followed by mounting the annular member 10 and the counterplate 11 and pouring an oil fluid under vacuum condition, and finally air tightly bonding the counterplate 11 to the sleeve body 9 by welding, thus providing a motor 1A.

The shaft 12 of the above-assembled rotor 4 is inserted into the hole 7a of the sleeve body 9 for manufacturing the motor 1A such that the fluid bearing 13 is defined.

When press fitting the sleeve body 9 into the hole (sleeve fitting hole 6a) of the flange assembly unit 51 for integrating both members, the annular recess 26 formed in the hole of the flange assembly unit 51 serves to reduce the area of the contact portion between the sleeve body 9 and the flange body 6. As a result, the whole press fitting force acting on the contact portion is reduced. This makes it possible to suppress the deformation of the inner diameter portion 7a of the sleeve body 9 caused by press fitting of the sleeve body 9. Accordingly, the respective deformations of the inner diameter portion 7a of the sleeve body 9 and the flange body 6 can be suppressed.

The annular recess 26 allows a part of the fitting force on the sleeve assembly unit 50 (sleeve 7) to ¥ run off by the amount corresponding to the area of the non-contact portion. The force generated by press fitting of the sleeve 7, and hence, the deforming action may be reduced. Therefore it is no longer necessary to machine a sleeve hole 7a after press fitting of the sleeve body 9 as the process required to cope with the deformation of the sleeve 7 owing to press fitting to the flange body 6 as has been conducted in the conventional art. This makes it possible to press fit the sleeve body 9 into the flange body 6, for example, after forming the flange assembly unit. The press fitting step may be set with a relatively high degree of freedom.

This embodiment requires no machining of the sleeve hole 7a after press fitting of the sleeve body 9. In this embodiment, the stator 3 is mounted to the flange body 6 to constitute the flange assembly unit 51 (sleeve fitting hole 6a) to which the sleeve body 9 is press fitted. The shaft of the rotor 4 is inserted to the sleeve hole 7a of the sleeve body 9, and the annular member 10 and the counterplate 11 are assembled and sealed with the oil fluid. The counterplate 11 is air tightly bonded for integrating both members.

In the conventional art, the sleeve hole 7a (inner peripheral wall) is formed in the state where the flange body 6 and the sleeve 7 are assembled and the stator 3 is further mounted to the flange body 6. The size and configuration of the resultant assembled body to be machined is increased and complicated. The size of the jig for the assembled body has to be large, thus requiring longer working time. This may hinder automatization of the process, resulting in deteriorated productivity. Meanwhile the present embodiment requires no machining of the sleeve hole 7a after press fitting of the sleeve 7. The resultant machining steps can be reduced, and assembly work is simplified, thus improving the productivity.

The present embodiment is provided with a single annular recess 26 as a recess. It is to be understood that, instead of a single annular recess 26, a plurality of annular recesses may be formed. Alternatively, at least one arched recess may be formed.

Figure 2:
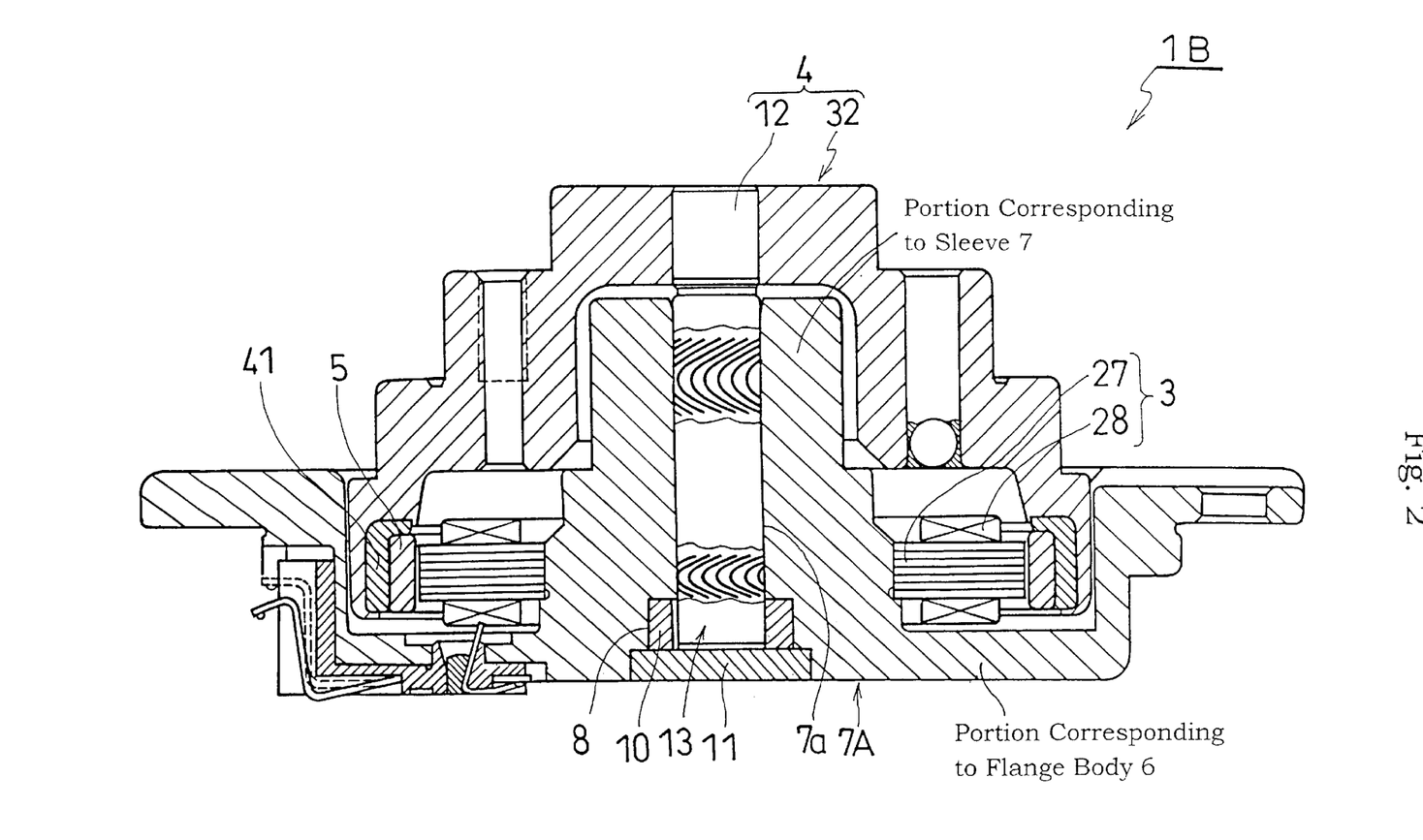
FIG. 2 is a cross sectional view of a motor according to a second embodiment of the present invention.

A second embodiment of the present invention will be described referring to FIG. 2. The parts identical to those shown in FIG. 1 will be designated with the same reference numerals. The explanation of those parts, thus, will be omitted.

A motor 1B includes a portion corresponding to the flange body 6 shown in FIG. 1 and a portion corresponding to the sleeve 7 shown in FIG. 1 which are formed into an integral unit (hereinafter referred to as an integral sleeve 7A) of a stainless steel. The motor 1B has no annular recess 26 formed in the flange body 6 as shown in FIG. 5.

In the aforementioned conventional art, the sleeve 7 is press fitted into the flange body 6 and then the sleeve hole 7a (inner peripheral wall) is machined to cope with the influence resulting from the deformation caused by the press fitting. Meanwhile, in the embodiment, the integral sleeve 7A is defined by the portion corresponding to the flange body 6 and the portion corresponding to the sleeve 7.

Therefore the motor according to this embodiment causes no deformation resulting from press fitting of the sleeve 7 as has been experienced in the conventional art. The present embodiment requires no process step for press fitting the sleeve 7 into the flange body 6 required by the conventional art, thus improving the productivity.

Figure 3:
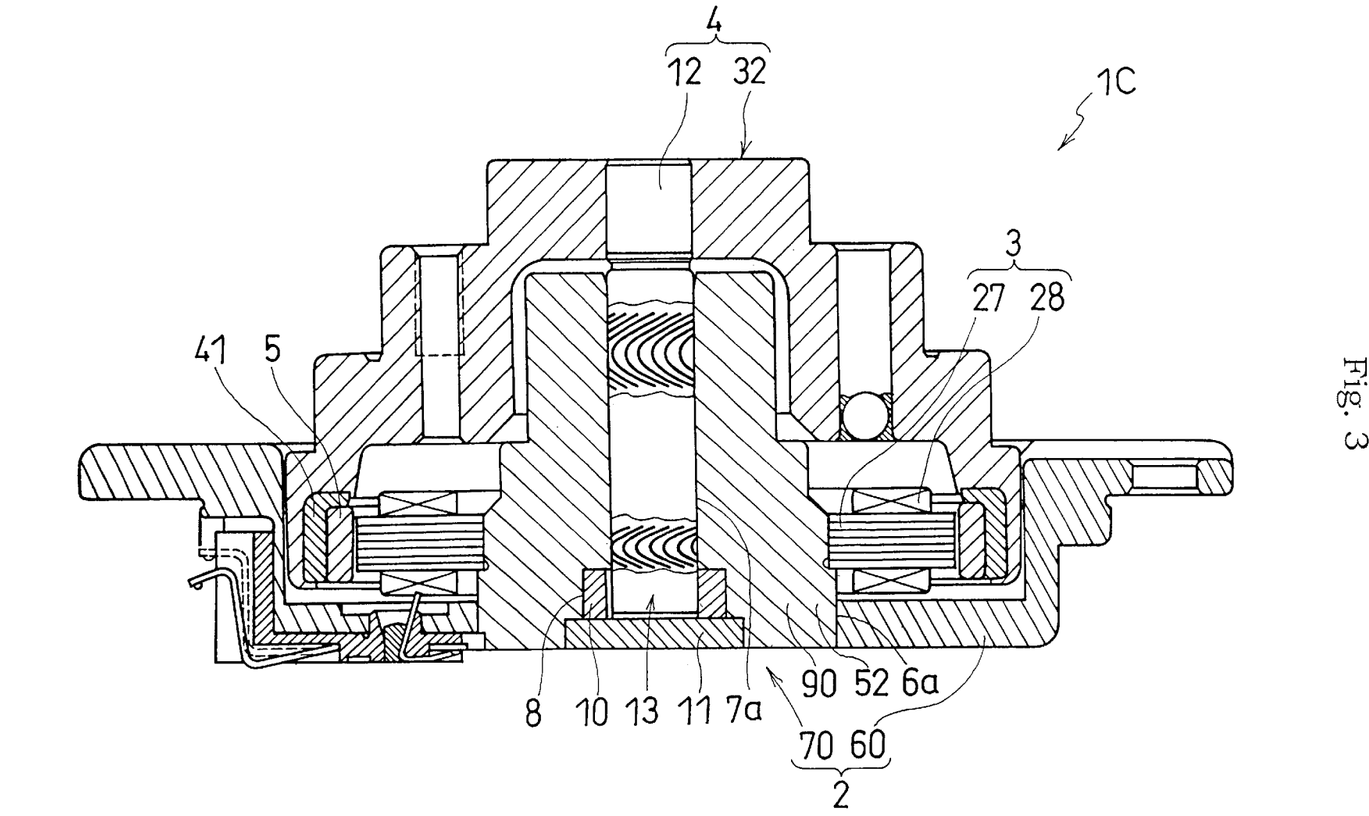
FIG. 3 is a cross sectional view of a motor according to a third embodiment of the present invention.

A third embodiment of the present invention will now be described referring to FIG. 3. The parts identical to those shown in FIG. 1 or FIG. 2 will be designated with the same reference numerals. The explanation of those parts, thus, will be omitted.

A flange 2 of a motor 1C according to the third embodiment of the present invention is composed of a sleeve 70 provided with a sleeve body 90 of a substantially cylindrical shape and a bulge (lower bulge 52) formed at the lower portion, and a flange body 60. The sleeve 70 is generally formed of the sleeve body 90 having an annular stepped portion 8 at the inner diameter side at one end and the lower bulge 52 at the end, an annular member 10, and a counterplate 11 disposed in the annular stepped portion 8 of the sleeve body 90. The counterplate 11 and sleeve body 90 are air tightly bonded by welding. The lower bulge 52 of the sleeve body 90 supports the stator 3.

In the third embodiment, the lower bulge 52 of the sleeve body 90 corresponds to the center cylindrical portion 20 of the first embodiment. The flange body 60 corresponds to the frame 21 of the first embodiment. The flange body 60 has a hole (sleeve fitting hole 6a) into which the lower bulge 52 of the sleeve body 90 is press fitted.

In the third embodiment, the stator 3 is mounted onto the lower bulge 52 of the sleeve body 90, which has been finished and cleaned (finished). The sleeve body 90 with the stator 3 is press fitted or adhered to the sleeve fitting hole 6a of the flange body 60 (that is, the lower bulge 52 of the finished sleeve body 90 is inserted to the sleeve fitting hole 6a of the flange body 60.) Then the shaft 12 of the rotor 4 formed of the hub 32 and the shaft 12 as already described is inserted into the sleeve hole 7a of the sleeve body 90 (that is, the shaft 12 of the assembled rotor 4 is inserted into the sleeve hole 7a of the sleeve body 90). The motor 1C, thus, is formed in the same way as in the first embodiment.

The fluid bearing 13 is formed in the process of manufacturing of the motor 1C by inserting the shaft 12 of the assembled rotor 4 into the sleeve hole 7a of the sleeve body 90.

In this embodiment, the lower bulge 52 is press fitted into the sleeve fitting hole 6a of the sleeve body 90 (flange body 60). The lower bulge 52 is formed to have a large thickness and high strength. Therefore the sleeve body 90 (sleeve 70) may be prevented from being deformed resulting from the force generated by press fitting of the sleeve body 90.

This embodiment requires no post machining of the sleeve hole 7a (inner peripheral wall of the sleeve) as has been required in the conventional art having the process for press fitting of the sleeve 7 as shown in FIG. 5. This makes it possible to eliminate the machining steps and simplify the production process, thus improving productivity.

The strength of the sleeve body 90 is enhanced by forming the lower bulge 52 so as to suppress the adverse influence accompanied with press fitting of the sleeve body 90. It is possible to change the sequence of the assembly steps of mounting the sleeve 70 or the like, that is, mounting the stator 3 to the lower bulge 52 of the sleeve body 90, press fitting the sleeve body 90 with the stator 3 into the sleeve fitting hole 6a of the flange body 60, and inserting the shaft 12 of the rotor 4 into the sleeve hole 7a of the sleeve body 90. The sequence may be changed such that the stator 3 is mounted to the lower bulge 52 of the sleeve body 90, the shaft 12 of the rotor 4 is inserted into the sleeve hole 7a of the sleeve body 90, and then the sleeve body 90 is press fitted into the sleeve fitting hole 6a of the flange body 6.

A motor according to the fourth embodiment of the present invention will be described referring to FIG. 4.

Figure 4:
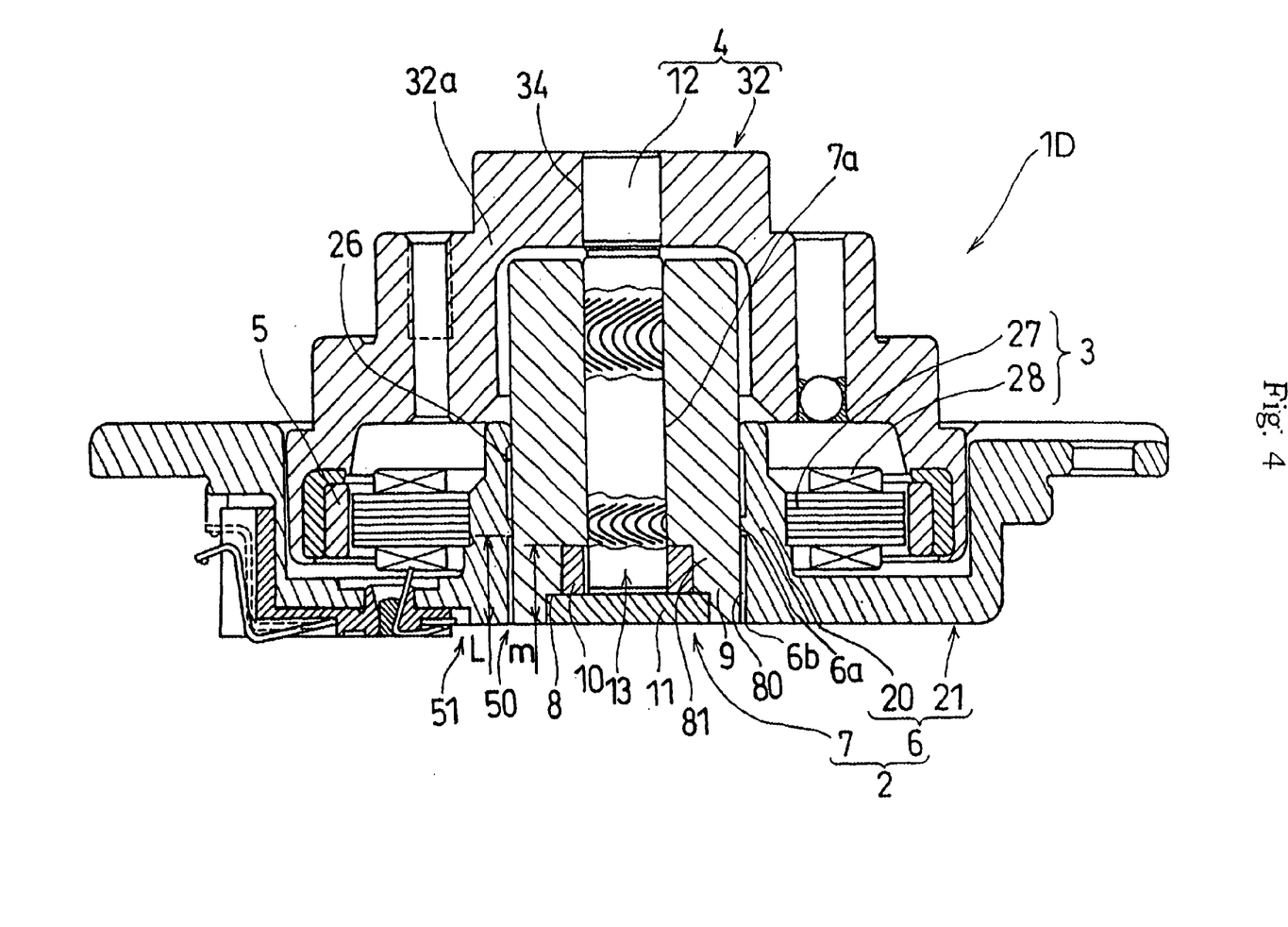
FIG. 4 is a cross sectional view of a motor according to a fourth embodiment of the present invention.

In FIG. 4, an annular recess 80 having the width of L is formed in the opening 6b of the sleeve fitting hole 6a of the inner peripheral wall of the center cylindrical portion 20 so as to relieve the press fitting force of the sleeve body 9. There is also provided with another annular recess 26 or recess, similar to that of the first embodiment, formed in the inside portion of the inner peripheral wall of the center cylindrical portion 20 (away from the opening 6b of the sleeve fitting hole 6a).

The annular recess 80 has the width L which is not smaller than the total length m of the thickness of the annular member 10 and the thickness of the counterplate 11 (L≧m) which are positioned in the annular stepped portion 8 of the sleeve body 9.

The length m as the total thickness of the annular member 10 and the counterplate 11 is equal to the depth of the portion of the sleeve body 9 into which those members are fitted. In other words, such portion of the sleeve body 9 into which the annular member 10 and the counterplate 11 are inserted (The portion will be referred to as an annular member fitting portion 81, and corresponding thereto, the recess 80 is formed in the opening 6b of the sleeve fitting hole 6a.) has a small thickness, and is likely to greatly deform the annular member fitting portion. The recess 80 formed in the opening 6b of the sleeve fitting hole 6a for corresponding to the annular member fitting portion 81 is capable of relieving the pressure force of the sleeve body 9 and preventing generation of the deformation.

Like the first embodiment, the annular recess 26 is provided with this embodiment. When inserting the sleeve body 9 into the hole (sleeve fitting hole 6a) of the flange assembly unit 51 for integrating both members, the area of the contact portion therebetween is reduced. This may reduce the whole pressure force acting on the contact portion, and the deformation of the inner diameter portion 7a of the sleeve body 9 caused by press fitting thereof can be decreased. As a result, the respective configurations of the inner diameter portion 7a of the sleeve body 9 and the flange body 6 can be prevented from being deformed. The area of the contact portion between the sleeve body 9 and the flange body 6 is further reduced owing to the recess 80, further contributing to the suppression of the deformation of the inner diameter portion 7a of the sleeve body 9 and the flange body 6.

Although the fourth embodiment employs the recess 80 that is annularly configured, the configuration is not limited, and at least one arch-shaped cut off may be formed.

Although the fourth embodiment employs a single annular recess 26, a plurality of annular recesses 26 may be formed. Alternatively, at least one arch-shaped recess may be formed instead of the annular recess 26.

In the fourth embodiment employing the annular recess 26, it may be eliminated and provide a recess 80 only as a recess.

The respective embodiments eliminate the finish machining process and cleaning of the sleeve body 9 (or 90) subsequent to the integration of the sleeve body 9 (or 90) and the flange body 6, preventing outgas due to the residual machining fluid in the press fit area.

According to the first to the forth aspects of the present invention, the flange body is provided with a recess in the hole of the wall of the flange body, which directs a part of the press fitting force exerted on the sleeve to the recess during press fitting of the sleeve into the hole of the flange body. The whole press fitting force exerted to the contact portion between the sleeve and the flange body is minimized, thus suppressing deformation of the sleeve.

The reduced press fitting force (fitting pressure), that is, deforming force may eliminate the machining of the sleeve hole subsequent to the press fitting of the sleeve, which has been conventionally required to cope with the sleeve deformation caused by its press fitting. The aforementioned elimination of the machining process makes it possible to improve the productivity.

According to the fifth aspect of the present invention, as the respective portions corresponding to the flange body and the sleeve body in any one of the first to the forth aspects are formed in one-piece, deformation caused by the press fitting of the sleeve, which has been experienced in the conventional art can be prevented. As a result, the process for press fitting the sleeve into the flange body can be eliminated, which has been required in the conventional art, thus improving the productivity.

According to the sixth aspect of the present invention, the sleeve is provided with the lower bulge as a press fit portion with which the flange body is fitted. This makes it possible to enhance the sleeve strength, suppressing deformation of the sleeve during press fitting. As a result, the machining of the sleeve caused by press fitting of the sleeve can be eliminated, reducing the machining process and simplifying the production process. The resultant productivity, thus, can be improved.

In any one of the seventh to the tenth aspects, similar to the aspect 1, a part of the press fitting force exerted to the sleeve body is directed to the recess during press fitting of the sleeve body, thus suppressing deformation of the sleeve body (sleeve). This may eliminate the machining of the sleeve hole subsequent to the press fitting of the sleeve that has been required in the conventional art. The resultant reduction in the machining process may improve the productivity.

According to the eleventh aspect of the present invention, the lower bulge as the press fitting portion of the finish machined sleeve body is press fitted into the hole of the flange body. As the press fitting portion has a large thickness, unlike the conventional art, it is hardly deformed by press fitting of the sleeve.

In the first to the eleventh aspects, the finish machining and cleaning of the sleeve body subsequent to the integration of the sleeve body and the flange body is no longer required. Therefore outgas owing to the residual cutting fluid in the press fit area may be prevented.

In any one of the third, forth, ninth or tenth aspects, the groove serves to relieve the press fitting force exerted to the sleeve even if the thickness of one end portion of the sleeve is reduced owing to press fitting of the counterplate, thus suppressing deformation.

What is claimed is:

1. A motor in which a rotor is provided with a magnet opposing to a stator on a flange body, comprising an annular extending step formed on an outer peripheral surface of a substantially cylindrical portion of the flange body for holding the stator, a sleeve which is press fitted and/or secured by adhesion into a hole formed in the substantially cylindrical portion of the flange body, a shaft of the rotor is inserted into an inner hole of the sleeve, and a plurality of grooves are formed on a peripheral surface of the inner hole of the sleeve, characterized in that an annular recess is formed on the peripheral surface of the hole formed in the substantially cylindrical portion of the flange body to relieve a press fitting force exerted to the plurality of grooves.

2. A motor according to claim 1, wherein the annular recess is a plurality of annular recesses.

3. A motor according to claim 1, wherein the annular recess is formed axially positioned opposing to where the grooves are formed on the peripheral surface of the inner hole of the sleeve.

4. A motor according to claim 1, wherein a portion corresponding to the substantially cylindrical portion of the flange body for holding the stator and a portion corresponding to the sleeve are in one-piece, the one-piece portion is press fitted and/or secured by adhesion into an opening of the flange body.

5. A method of manufacturing a motor according to claim 4, comprising the steps of:

press fitting and/or securing by adhesion a lower bulge of the sleeve into the opening of the flange body, inserting the shaft into the inner hole of the sleeve body so as to define a fluid bearing unit, dispensing a fluid, and completing the motor in which the rotor is provided.

6. A method of manufacturing a motor, according to claim 1 comprising the steps of:

press fitting and/or securing by adhesion the sleeve into the hole formed in the substantially cylindrical portion of the flange body, inserting the shaft into the inner hole of the sleeve so as to define a fluid bearing unit, dispensing a fluid, and completing the motor in which the rotor is provided.

7. A motor according to claim 1, wherein a portion corresponding to the flange body and the sleeve are in one-piece.

* * * * *

UNITED STATES PATENT AND TRADEMARK OFFICE
CERTIFICATE OF CORRECTION

PATENT NO. : 6,657,340 B2
DATED : December 2, 2003
INVENTOR(S) : Rikuro Obara

It is certified that error appears in the above-identified patent and that said Letters Patent is hereby corrected as shown below:

Title page,
Please replace the title page with the attached title page.

Drawings,
Please replace Fig. 4 with the attached Fig. 4.

Signed and Sealed this

Tenth Day of May, 2005

JON W. DUDAS
*Director of the United States Patent and Trademark Office*

(12) United States Patent
Obara (10) Patent No.: US 6,657,340 B2
(45) Date of Patent: Dec. 2, 2003

(54) MOTOR AND METHOD OF MANUFACTURING THE SAME

(75) Inventor: Rikuro Obara, Miyota-machi (JP)

(73) Assignee: Minebea Co., Ltd., Nagano-ken (JP)

(*) Notice: Subject to any disclaimer, the term of this patent is extended or adjusted under 35 U.S.C. 154(b) by 0 days.

(21) Appl. No.: 09/892,461

(22) Filed: Jun. 28, 2001

(65) Prior Publication Data

US 2002/0047392 A1 Apr. 25, 2002

(30) Foreign Application Priority Data

Jun. 29, 2000 (JP) .................................. 2000-196652

(51) Int. Cl.$^7$ ................................................ H02K 7/08
(52) U.S. Cl. ............................ 310/90; 29/598; 384/100
(58) Field of Search ............................. 310/90; 29/598; 384/100

(56) References Cited

U.S. PATENT DOCUMENTS

| | | | | |
|---|---|---|---|---|
| 5,141,338 A | * | 8/1992 | Asada et al. | 384/100 |
| 5,715,116 A | * | 2/1998 | Moritan et al. | 310/67 R |
| 5,822,846 A | * | 10/1998 | Moritan et al. | 29/598 |
| 5,880,545 A | * | 3/1999 | Takemura et al. | 310/67 R |
| 6,057,619 A | * | 5/2000 | Domberg et al. | 310/90 |
| 6,242,830 B1 | * | 6/2001 | Katagiri | 29/598 |
| 6,310,415 B1 | * | 10/2001 | Horng | 310/67 R |
| 6,354,742 B1 | * | 3/2002 | Iwaki et al. | 384/107 |
| 6,364,532 B1 | * | 4/2002 | Yoshikawa et al. | 384/100 |

FOREIGN PATENT DOCUMENTS

| | | | |
|---|---|---|---|
| JP | 0874867 A | * 3/1996 | |
| JP | 09303408 A | * 11/1997 | F16C/35/02 |

* cited by examiner

*Primary Examiner*—Joseph Waks
(74) *Attorney, Agent, or Firm*—Oliff & Berridge, PLC (57) ABSTRACT

A motor and a method of manufacturing the motor are provided for preventing undesirable deformation of the sleeve hole caused by a press fitting force during press fitting process, thus facilitating the assembly process and improving the productivity. A recess is formed on an inner peripheral wall of a center cylindrical portion at the center of a flange body. When press fitting a sleeve body into a hole (sleeve fitting hole) of a flange assembly unit for integrating both members, the annular recess of the flange assembly unit serves to reduce the contact area between the sleeve body and the flange body. The press fitting force exerted to the contact area is reduced. Therefore the deformation of the inner diameter of the sleeve body that has been press fitted is minimized, thus suppressing deformation of the inner diameter portion of the sleeve body and the flange body.

7 Claims, 5 Drawing Sheets

UNITED STATES PATENT AND TRADEMARK OFFICE
CERTIFICATE OF CORRECTION

PATENT NO. : 6,657,340 B2  Page 1 of 2
DATED : December 2, 2003
INVENTOR(S) : Rikuro Obara It is certified that error appears in the above-identified patent and that said Letters Patent is hereby corrected as shown below:

Delete Drawing Sheet 4 and substitute therefor the drawing Sheet consisting of Fig. 4 as shown on the attached page.

Signed and Sealed this

Seventh Day of June, 2005

JON W. DUDAS
*Director of the United States Patent and Trademark Office*